United States Patent
Hagano et al.

(10) Patent No.: US 9,221,333 B2
(45) Date of Patent: Dec. 29, 2015

(54) FUEL TANK OPENING-CLOSING DEVICE

(75) Inventors: Hiroyuki Hagano, Kiyosu (JP); Masaki Akagi, Okazaki (JP); Chiaki Kataoka, Nagakute (JP); Satoshi Yamamoto, Nagoya (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 338 days.

(21) Appl. No.: 13/878,808

(22) PCT Filed: Oct. 12, 2011

(86) PCT No.: PCT/JP2011/005694
§ 371 (c)(1),
(2), (4) Date: Apr. 11, 2013

(87) PCT Pub. No.: WO2012/049836
PCT Pub. Date: Apr. 19, 2012

(65) Prior Publication Data
US 2013/0193140 A1    Aug. 1, 2013

(30) Foreign Application Priority Data

Oct. 14, 2010  (JP) ................................. 2010-231557

(51) Int. Cl.
*B60K 15/04*    (2006.01)

(52) U.S. Cl.
CPC ......... *B60K 15/04* (2013.01); *B60K 2015/0461* (2013.01); *B60K 2015/0483* (2013.01)

(58) Field of Classification Search
CPC ....................... B60K 15/04; B60K 2015/0483
USPC ......................................... 141/350; 220/86.2
See application file for complete search history.

(56) References Cited

U.S. PATENT DOCUMENTS

| | | | | |
|---|---|---|---|---|
| 3,730,216 | A * | 5/1973 | Arnett et al. | 137/588 |
| 6,230,739 | B1 * | 5/2001 | Gericke | 137/588 |
| 6,968,874 | B1 * | 11/2005 | Gabbey et al. | 141/349 |
| 7,077,178 | B2 * | 7/2006 | Hedevang | 141/367 |
| 7,621,303 | B2 * | 11/2009 | Buchgraber | 141/350 |
| 7,661,550 | B2 * | 2/2010 | Feichtinger | 220/86.2 |
| 8,539,993 | B2 * | 9/2013 | Hagano | 141/350 |
| 2007/0034287 | A1 * | 2/2007 | Groom et al. | 141/350 |

FOREIGN PATENT DOCUMENTS

| | | |
|---|---|---|
| JP | 2008-049952 A | 3/2008 |
| JP | 2008-265621 A | 11/2008 |

* cited by examiner

*Primary Examiner* — Timothy L Maust
(74) *Attorney, Agent, or Firm* — Posz Law Group, PLC

(57) ABSTRACT

A fuel tank opening-closing device has a tank opening forming member, a flap valve mechanism that has an opening-closing member, and an opening-closing activation mechanism that switches between the locked position and the unlocked position that does the opening operation of the opening-closing member. The opening-closing activation mechanism has a nozzle detection mechanism which has introductory push parts mounted on the opening-closing member and adapted to receive force of motion in the insertion direction of the fueling nozzle, and a lock member that is mounted on the tank opening forming member and that selectively shifts between the locked position and the unlocked position by engaging and disengaging with the opening-closing member, and a locking mechanism that moves the locking member from the locked position to the unlocked position by being pushed by the introductory push parts.

16 Claims, 13 Drawing Sheets

FUEL TANK OPENING-CLOSING DEVICE

CROSS REFERENCE TO RELATED APPLICATIONS

This application is a U.S. national stage application of International Patent Application No. PCT/JP2011/005694 filed on Oct. 12, 2011, claiming the benefit of and priority from Japanese Patent Application No. 2010-231557 filed Oct. 14, 2010, the content of which is incorporated herein by reference.

TECHNICAL FIELD

The present invention relates to a fuel tank opening-closing device having a flapper valve adapted to open through insertion force of the fueling nozzle to allow filling of the fuel tank.

BACKGROUND ART

A fuel tank opening-closing device, as shown in JP-A 2008-49952, includes a shutter mechanism that opens and closes the inlet of a tank opening forming member (flap valve mechanism), and a locking mechanism that allows the opening operation of the shutter mechanism. The locking mechanism includes a nozzle guide part inner diameter positioning part (nozzle detection mechanism) and a lock member, and by moving the lock member from the locked position to the unlocked position by being pushed by the tip of inner diameter side of the fueling nozzle, the opening operation of the shutter mechanism is allowed, the shutter opens by pushing using the tip of the fueling nozzle, and this is how fueling is performed.

However, with related fuel tank opening-closing devices, because a lock member and inner diameter positioning part are incorporated in the shutter mechanism, the constitution and arrangement are complex, and there was the problem of requiring a strict dimensional tolerance to guide the fueling nozzle to the inner diameter positioning part which is determined by the fueling nozzle inner diameter.

SUMMARY OF INVENTION

Technical Problem

An advantage of some aspects of the invention is to provide a fuel tank opening-closing device with a simple constitution for the nozzle detection mechanism and the flap valve mechanism.

Solution to Problem

According to an aspect of the invention, there is a fuel tank opening-closing device for opening and closing a path for supplying fuel to a fuel tank. The fuel tank opening-closing device comprises: a tank opening forming member that includes a fuel path connected to the fuel tank, an insertion path for inserting a fueling nozzle, and an inlet disposed between the fuel path and the insertion path; a flap valve mechanism that is disposed inside the tank opening forming member, and has an opening-closing member for opening and closing the inlet by being pressed by an end of the fueling nozzle; and an opening-closing activation mechanism that can switch between a locked position in which opening operation of the opening-closing member is locked, and an unlocked position in which opening operation of the opening-closing member is permitted when the opening-closing member is pushed by the fueling nozzle. The opening-closing activation mechanism includes: a nozzle detection mechanism having introductory push parts mounted on the opening-closing member and disposed in the insertion path, and adapted to receive force of motion in an insertion direction of the fueling nozzle; and a locking mechanism having a lock member that is mounted on the tank opening forming member near the inlet, and selectively shuttled to the locked position and the unlocked position by engaging and disengaging with the opening-closing member, the lock member being configured to move from the locked position to the unlocked position through interlocking operation with the introductory push part.

With the fuel tank opening-closing device of application example 1, when the fueling nozzle is inserted from the insertion path of the tank opening forming member and the tip of the fueling nozzle presses the introductory push part of the nozzle detection mechanism, the locking mechanism lock member moves from the locked position to the unlocked position, going to a state whereby the opening-closing member opening operation is allowed. Furthermore, when the fueling nozzle is pushed in, the opening operation of the opening-closing member of the flap valve mechanism is performed, and by doing this, fueling is done from the fueling nozzle to the fuel path. When fueling has ended, and the fueling nozzle is removed from the fuel path and insertion path, the lock member engages with the locked part. By doing this, the opening-closing member returns to the initial state in the locked position with the inlet closed.

Also, with the opening-closing activation mechanism, only the nozzle detection member constituting the nozzle detection mechanism is mounted on the opening-closing member, and the lock member constituting the locking mechanism is mounted on the tank opening forming member, in other words, the lock member does not need to be disposed on the opening-closing member, so it is not necessary to provide a complex moving mechanism on the opening-closing member, and it is possible to make the constitution simple.

Furthermore, the nozzle detection member is mounted on the opening-closing member, so it is not necessary to install a plurality of members at locations facing the insertion path of the tank opening forming member, and it is possible to make this a simple constitution.

Also, the introductory push part coordinates with the opening-closing member and move to the depth side of the fuel passage, and retreats from the insertion path that reaches the inlet from the introduction port. Thus, the fueling nozzle is able to be inserted from the inlet to the fuel tank side without interference of the introductory push part, so the fuel rising in the fuel passage contacts the full tank detection hole at an early stage, and it is possible to operate auto stop. Thus, fuel does not leak easily from the introduction port of the tank opening forming member.

With another example, it is possible to use a constitution for which the moving direction of the introductory push part of the nozzle detection member and the moving direction of the lock member are the same radial direction. Using this constitution, a mechanism such as a cam that converts the operating direction is not necessary, so it is possible to use a simple constitution.

Furthermore, it is possible to have a constitution with which the lock member of the locking mechanism of another application example, and the lock engaging part, are supported by the support projections of the inlet forming member being respectively inserted into the slots formed integrally with the lock engaging part, and are suppressed by the upper wall of the opening forming member. With this constitution, the lock member is held in the inlet forming member, so a separate mechanism for retaining the lock member is unnecessary, and it is possible to make the constitution simple.

With the introductory push part of another application example, it is possible to have a constitution such that by being supported so as to be able to rotate on the wall of the opening-closing member, and by rotation of the introductory push part, the lock engaging part moves to the outward radial direction and disengages from the locked part. Furthermore, the constitution can also be such that the introductory push parts are disposed at both sides of the insertion path, and an arm linking the introductory push parts is provided. With this constitution, an action as a return spring is given to the arm, and even when there is a plurality of introductory push parts, these are integrated as a single unit, so assembly work and the like is easy.

These and other objects, features, aspects, and advantages of the present invention will become more apparent from the following detailed description of the preferred embodiments with the accompanying drawings.

DESCRIPTION OF EMBODIMENTS

Figure 1:
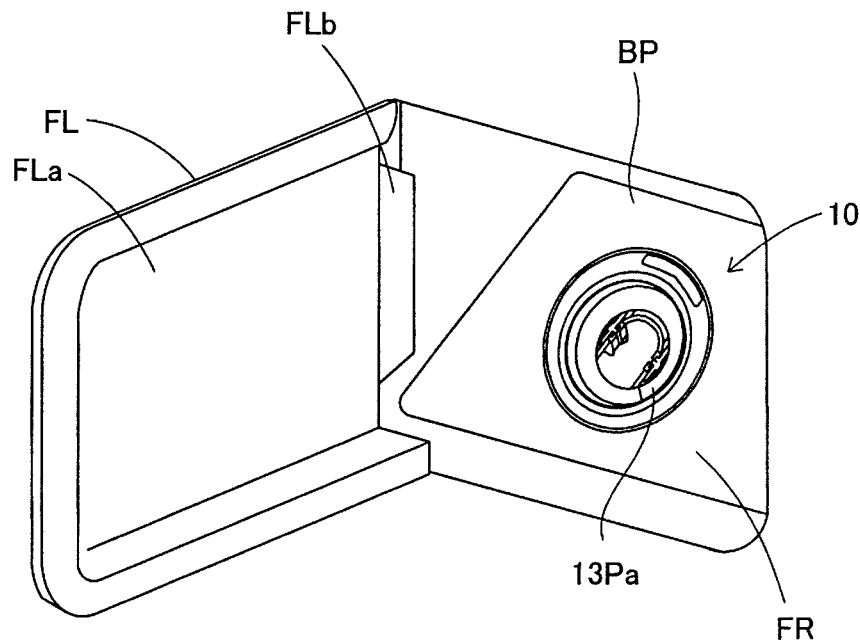
FIG. 1 is a perspective view showing the state when the fueling lid of the fuel tank opening-closing device according to the first embodiment of the present invention is open.

A. First Embodiment (1) Schematic Structure of the Fuel Tank Opening-Closing Device FIG. 1 is a perspective view for describing the fuel tank opening-closing device of the first embodiment of the present invention. At the back part of the car body of an automobile, a fueling lid FL for fueling the fuel is supported to be able to open and close. With the fueling lid FL, a lid main body FLa which follows the outer plate of the car body is supported to be able to open and close at the outer plate of the car body via a hinge FLb. The spaced opened by the fueling lid FL becomes the fueling bay FR, and a fuel tank opening-closing device 10 supported on a basal plate BP is disposed inside this fueling bay FR. The fuel tank opening-closing device 10 is a mechanism for supplying fuel to the fuel tank without using a fuel cap, and has a constitution by which after the fueling lid FL is opened, it is possible to supply fuel to the fuel tank from a fueling nozzle by opening and closing the fuel passage by external force from the fueling nozzle. Following, we will describe the detailed constitution of the fuel tank opening-closing device.

(2) Constitution and Operation of Each Part

Figure 2:
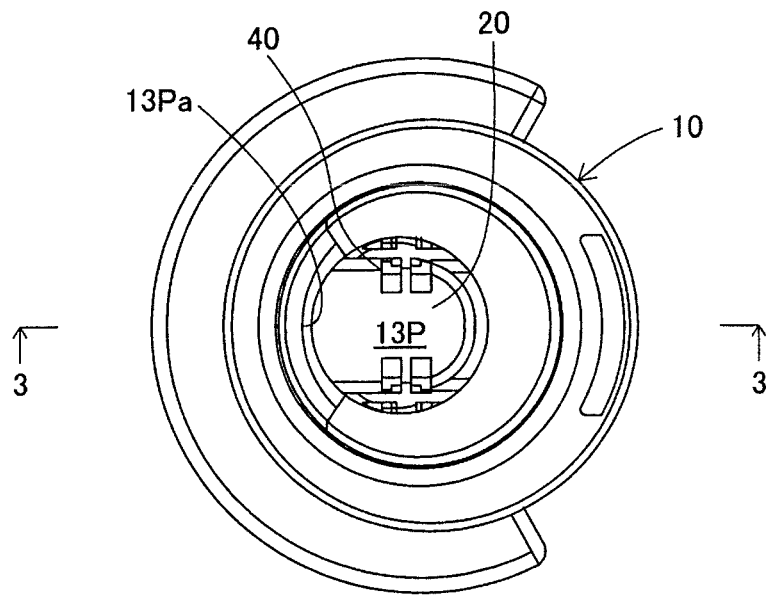
FIG. 2 is a plan view showing the opening part of the fuel tank opening-closing device.
Figure 3:
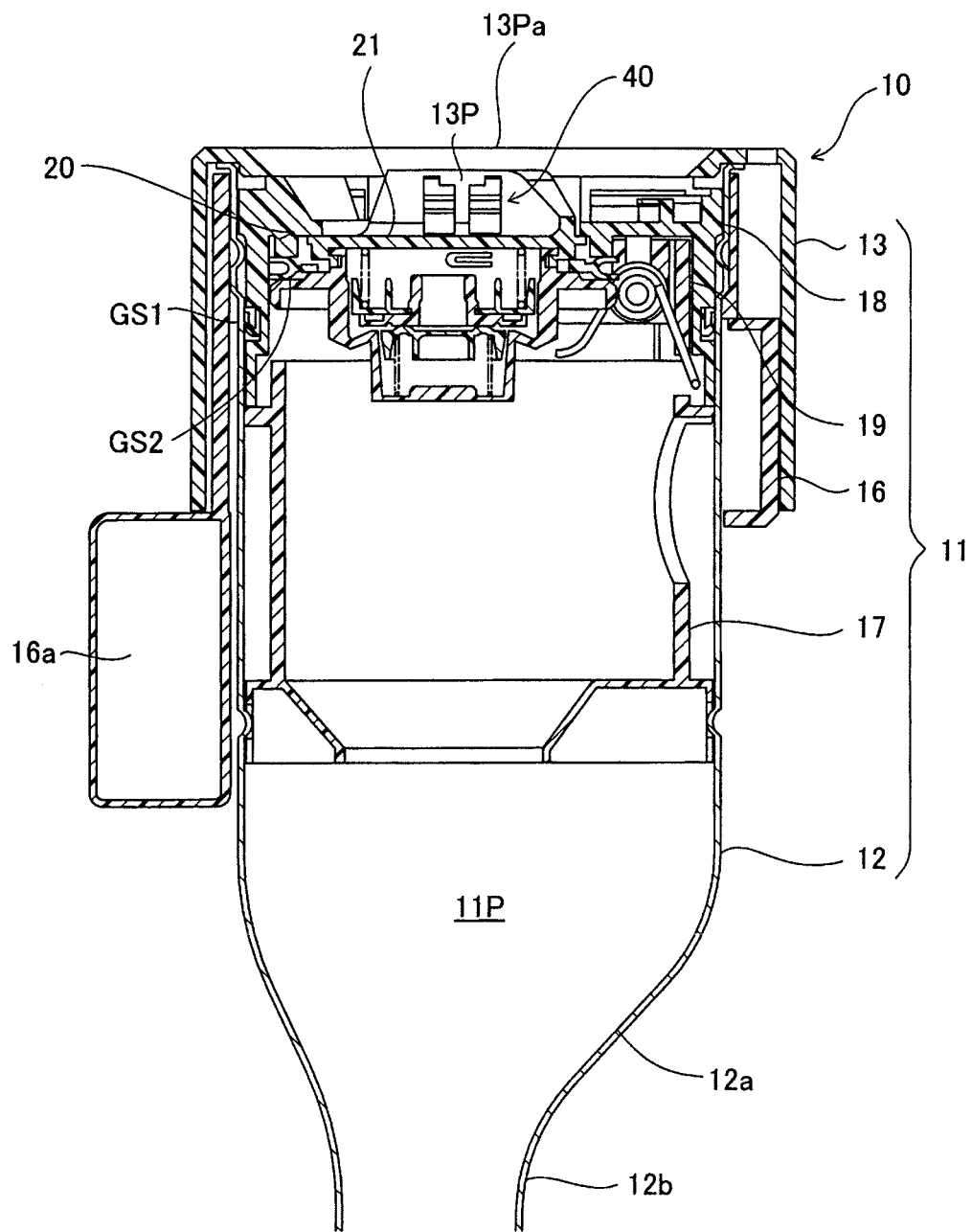
FIG. 3 is a cross sectional view along line 3-3 of FIG. 2.

FIG. 2 is a plan view showing the opening part of the fuel tank opening-closing device 10. FIG. 3 is a cross sectional view along line 3-3 of FIG. 2. In FIG. 3, the fuel tank opening-closing device 10 is equipped with a tank opening forming member 11 having a fuel passage 11P connected to the fuel tank (not illustrated), a flap valve mechanism 20, and an opening-closing activation mechanism 40 for opening and closing the flap valve mechanism 20.

(2)-1 Tank Opening Forming Member 11

Figure 4:
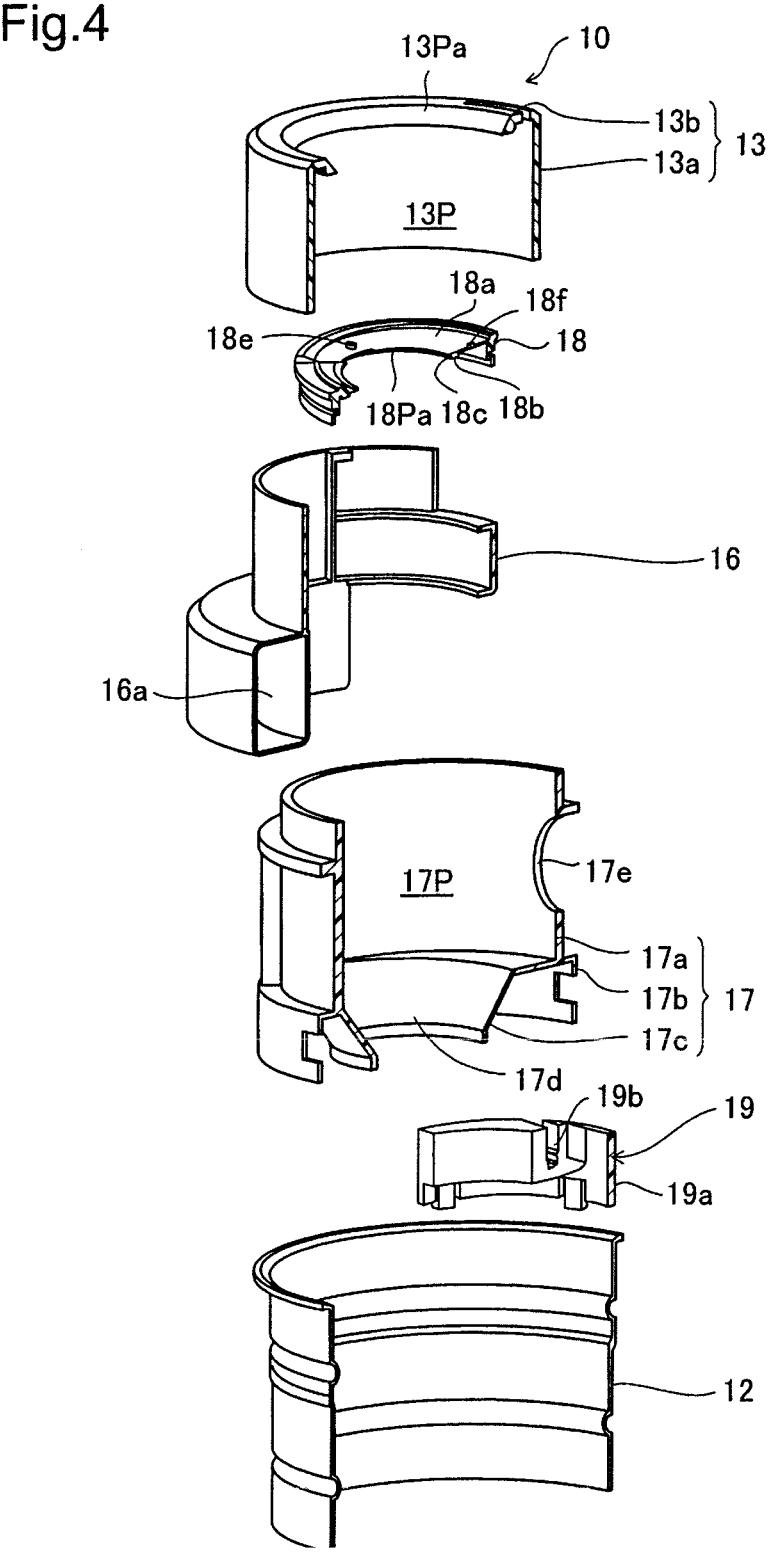
FIG. 4 is a partial, fractured and exploded perspective view of the tank opening forming member.

FIG. 4 is partial, fractured, exploded perspective view of the tank opening forming member 11. In FIG. 3 and FIG. 4, the tank opening forming member 11 is a tube constituting the fuel passage 11P, and is equipped with a metal connecting pipe 12 connected to the fuel tank, an opening forming member 13 fixed to the top part of the connecting pipe 12, a reinforcing member 16 disposed facing downward from the inside of the opening forming member 13, a nozzle guide member 17 mounted inside the connecting pipe 12, an inlet forming member 18 disposed above the nozzle guide member 17, and a valve support element 19 for supporting the flap valve mechanism 20.

As shown in FIG. 3, the connecting pipe 12 is equipped with a reduced diameter part 12a for which the diameter is gradually reduced for the fuel tank side, and a straight tube part 12b connected to the reduced diameter part 12a, and these are formed as an integral unit. In FIG. 4, the opening forming member 13 is equipped with a cylindrically shaped side wall 13a mounted on the top part of the connecting pipe 12 and an upper wall 13b, these are formed in a cup shape, and form an insertion path 13P for inserting the fueling nozzle FZ. The upper wall 13b forms the introduction port 13Pa. The reinforcing member 16 is disposed at the outside of the nozzle guide member 17 from inside the opening forming member 13, and is equipped with a storage chamber 16a for storing a filter or the like. The nozzle guide member 17 is a member that guides the fueling nozzle to the back of the fuel passage 11P, and is equipped with a cylindrical wall 17a, a broadened diameter wall 17b for which the diameter is broadened from the bottom part of the cylindrical wall 17a, and a nozzle guide 17c disposed on the inside of the broadened diameter wall 17b. An insertion opening 17d is formed at the center part of the nozzle guide 17c. Also, an escape hole 17e is formed so as to increase the opening degree of the flap valve mechanism 20 by inserting the bottom part of the flap valve mechanism 20 in the cylindrical wall 17a.

The flap valve mechanism 20 (FIG. 3) is fixed to the connecting pipe 12 (FIG. 3) via the inlet forming member 18 and the valve support element 19. The inlet forming member 18 is fixed to the top part of the connecting pipe 12, is a member for supporting a portion of the flap valve mechanism 20, is equipped with a circular plate part 18a having an inlet 18Pa forming part of the fuel passage 11P, and uses the lower part of the opening periphery part of the inlet 18Pa as the seal part 18b. The outer periphery part of the inlet forming member 18 is sealed with the inner wall of the connecting pipe 12 via a gasket GS1. The valve support element 19 is held within the inlet forming member 18, and a half cylindrical wall 19a as well as a support recess 19b for doing axial support of the flap valve mechanism 20 from the top part of the half cylindrical wall 19a are formed.

(2)-2 Flap Valve Mechanism 20

Figure 5:
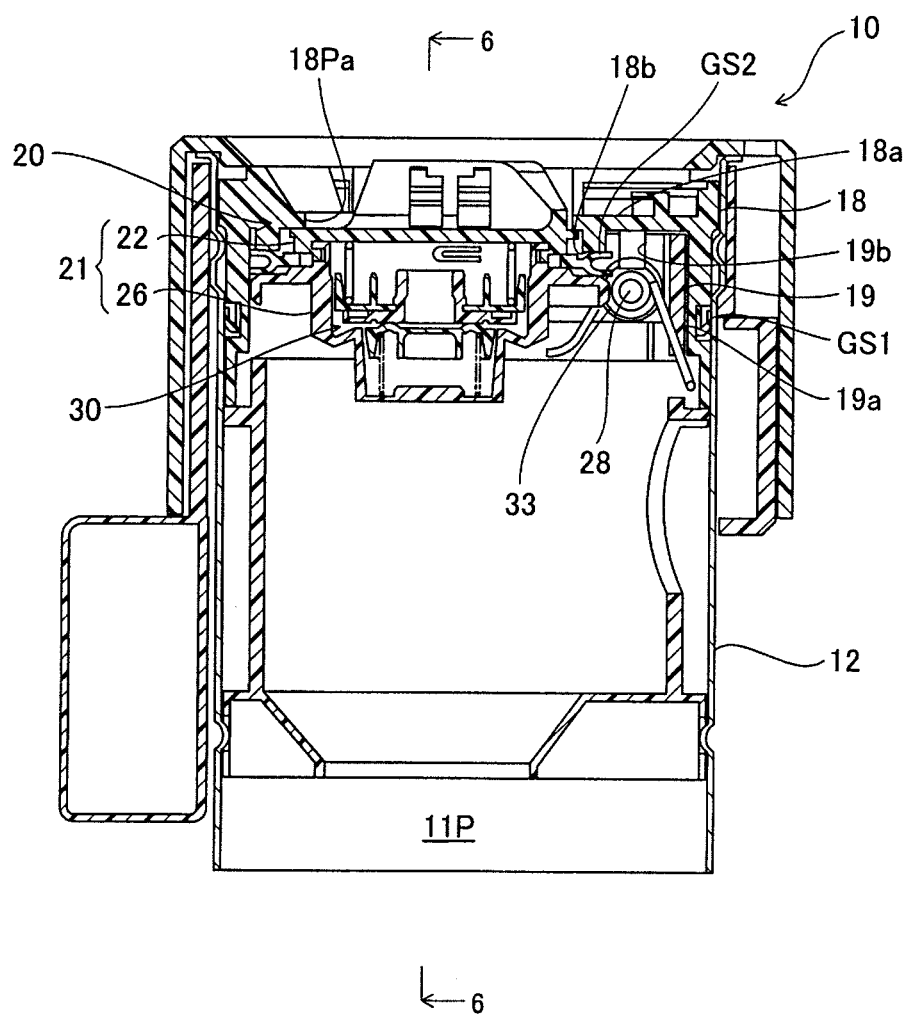
FIG. 5 is a cross sectional view showing the top part of the fuel tank opening-closing device of FIG. 3.
Figure 6:
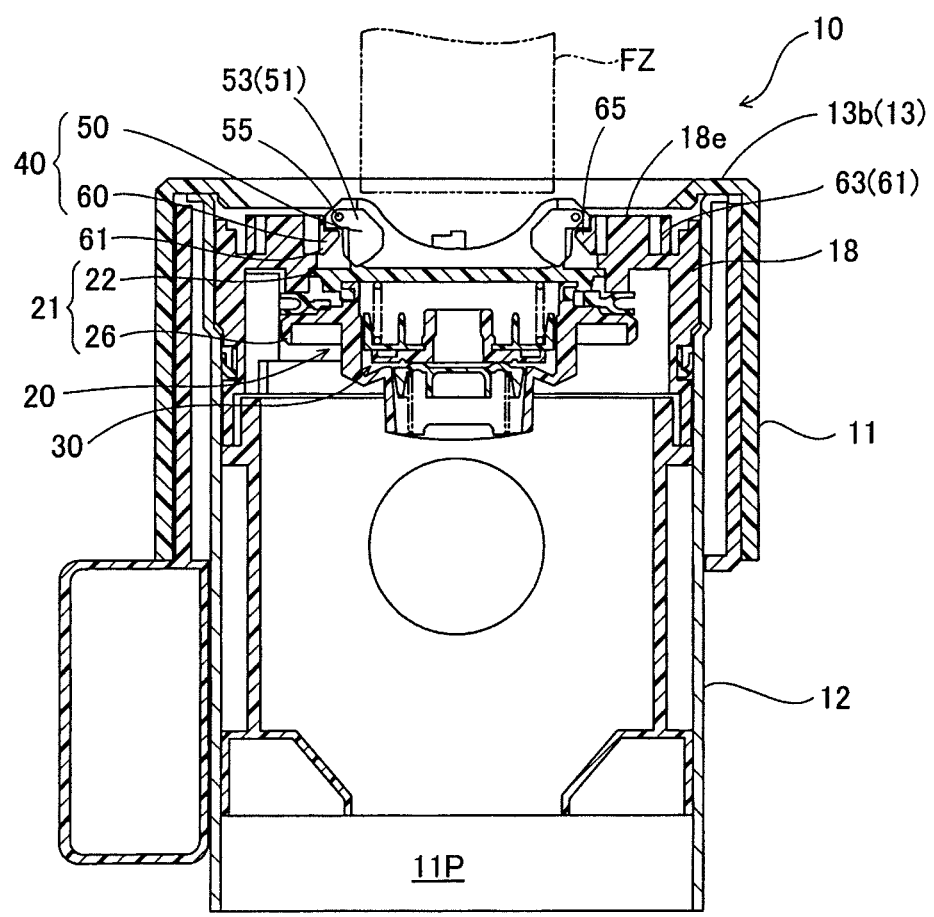
FIG. 6 is a cross sectional view along line 6-6 of FIG. 5.
Figure 7:
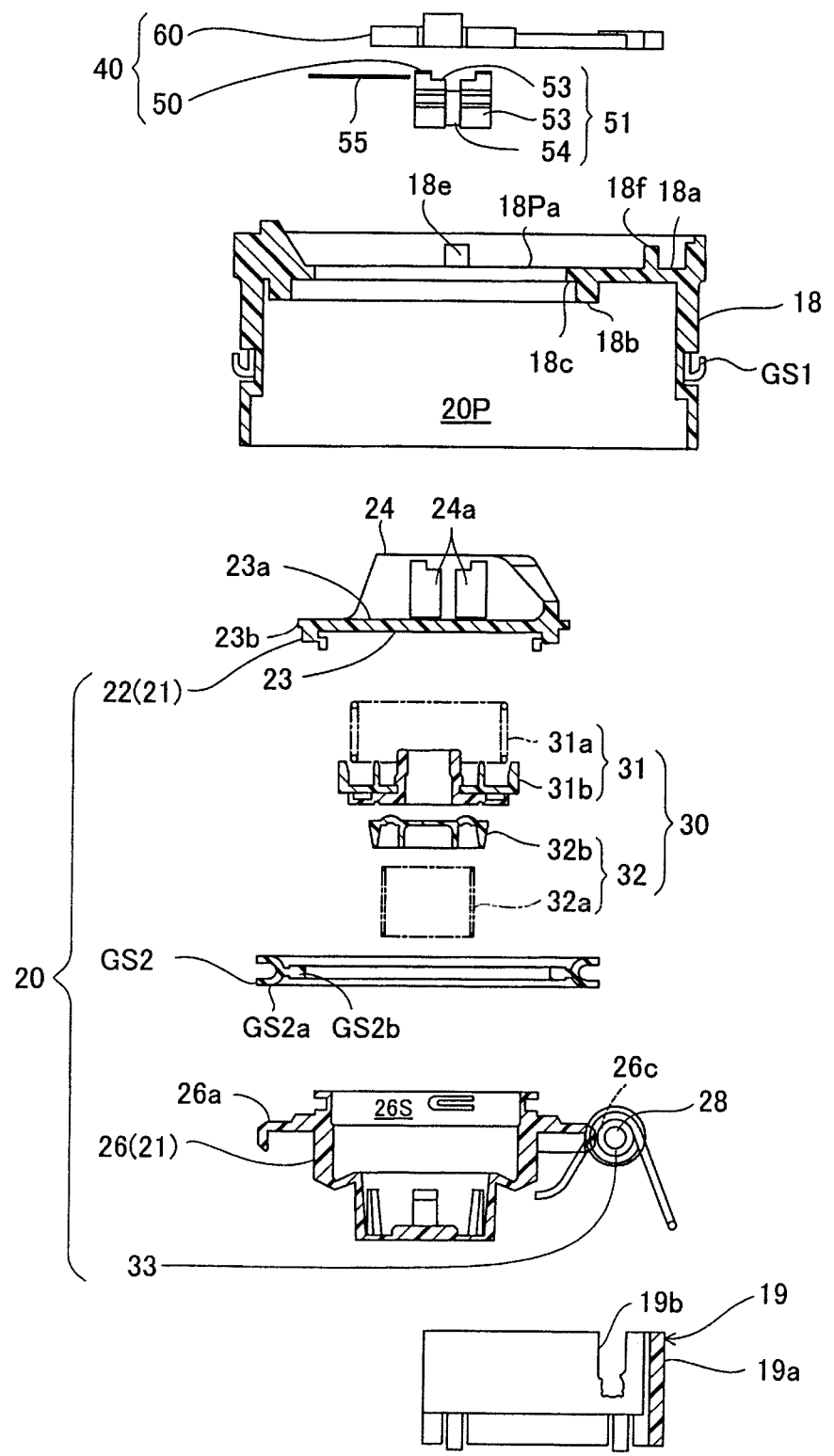
FIG. 7 is an exploded cross sectional view of the key parts of the fuel tank opening-closing device.

FIG. 5 is a cross sectional view showing the top part of the fuel tank opening-closing device 10 of FIG. 3, FIG. 6 is a cross sectional view along line 6-6 of FIG. 5, and FIG. 7 is an exploded cross sectional view of the major parts of the fuel tank opening-closing device 10. In FIG. 7, the flap valve mechanism 20 is equipped with an opening-closing member 21, a spring 33, and a gasket GS2. The opening-closing member 21 is axially supported on the valve support element 19, and is a member that opens and closes the inlet 18Pa. The spring 33 is a helical spring, one of its coil shaped end parts is supported on the inlet forming member 18, and the other end is supported on the opening-closing member 21 and is energized in the direction that closes the opening-closing member 21. The opening-closing member 21 is equipped with a pressing member 22, a valve chamber defining member 26, a shaft 28, and a pressure regulating valve 30. The shaft 28 is supported so as to be able to rotate by being inserted in the bearing 26c formed on the end of the valve chamber defining member 26 and the support recess 19b provided on the valve support element 19.

Figure 8:
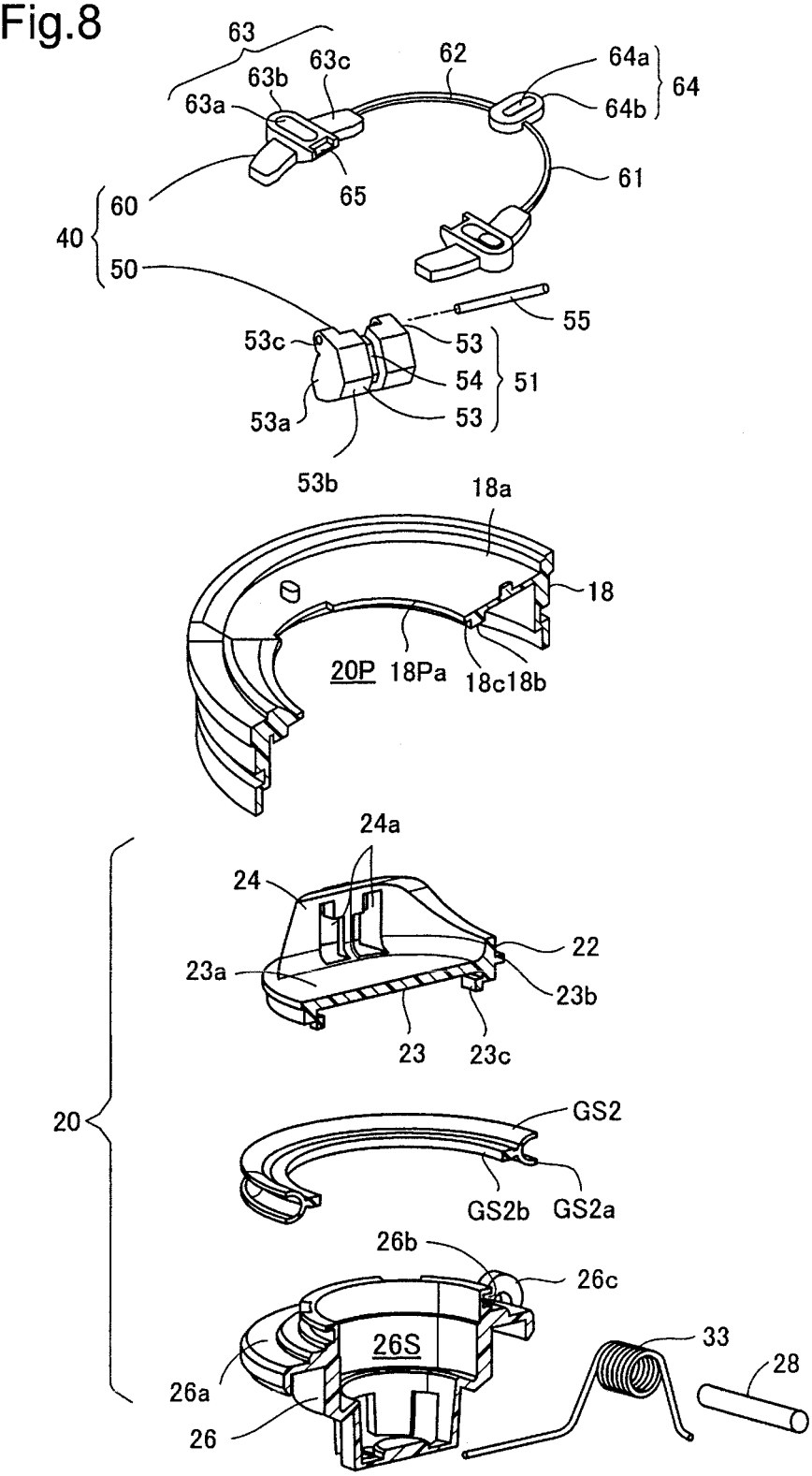
FIG. 8 is a partial, fractured and exploded perspective view of the flap valve mechanism and the opening-closing activation mechanism.

FIG. 8 is a partial, fractured, exploded perspective view of the flap valve mechanism 20 and the opening-closing activation mechanism 40. The pressing member 22 is formed from a conductive resin, and is formed by an upper face part 23 which is an almost plate shaped member for directly receiving the pressing force of the fueling nozzle FZ, and a wall 24 provided projecting upward from both sides of the outer periphery top part of the upper face part 23. A guide face 23a for smoothing the contact with the fueling nozzle is formed on the upper face part 23. A sensor insertion hole 24a for mounting a nozzle detection mechanism 50 described later is formed at two locations on the wall 24. A flange 23b is formed on the outer periphery of the upper face part 23, and by coming in contact with an opening side stopper 18c of the inlet forming member 18, in a state with the opening-closing member 21 closed, the gap with the inlet 18Pa is eliminated, and penetration of rain water or the like to the interior is prevented.

The valve chamber defining member 26 is cup shaped, and forms a valve chamber 26S for storing the pressure regulating valve 30. The flange 26a is formed on the outer periphery of the valve chamber defining member 26. The gasket GS2 is formed from a rubber material, is equipped with a C-shaped seal main body GS2a, and a support part GS2b of the inner periphery of the seal main body GS2a, the support part GS2b is held by being grasped between the top surface of the inner periphery side of the flange 26a and the flange 23b of the pressing member 22, and the inlet 18Pa is sealed by the top surface of the outer periphery side compressing the gasket GS2 between it and the seal part 18b. The valve chamber defining member 26 is attached to the pressing member 22 by the engaging recess 26b of the lower part engaging with the engaging protrusion 23c of the pressing member 22.

The pressure regulating valve 30 shown in FIG. 7 is stored inside the valve chamber 26S which is surrounded by the pressing member 22 and the valve chamber defining member 26, is equipped with a positive pressure valve 31 having a positive pressure valve body 31b energized by the spring 31a, and a negative pressure valve 32 having a negative pressure valve body 32b energized by the spring 32a, and the fuel tank pressure is adjusted by opening and closing both valves so that the tank internal pressure of the fuel tank is within a predetermined range.

(2)-3 Opening-Closing Activation Mechanism 40

In FIG. 6, the opening-closing activation mechanism 40 is disposed so as to be mounted and linked to the inlet forming member 18 and the flap valve mechanism 20 opening-closing member 21, and is a mechanism that allows the opening operation of the opening-closing member 21 by being pressed by the tip of the fueling nozzle FZ, and as its key structures, is equipped with the nozzle detection mechanism 50 and the locking mechanism 60.

Figure 9:
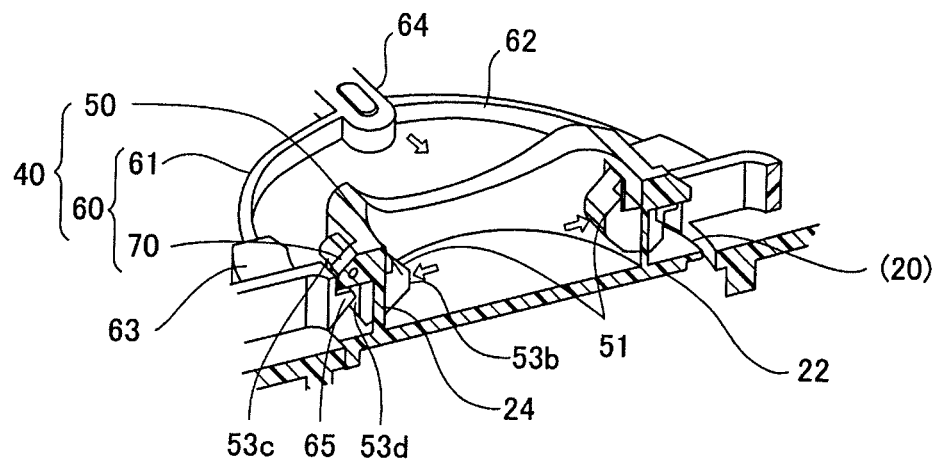
FIG. 9 is a partial, fractured perspective view of the opening-closing activation mechanism.
Figure 10:
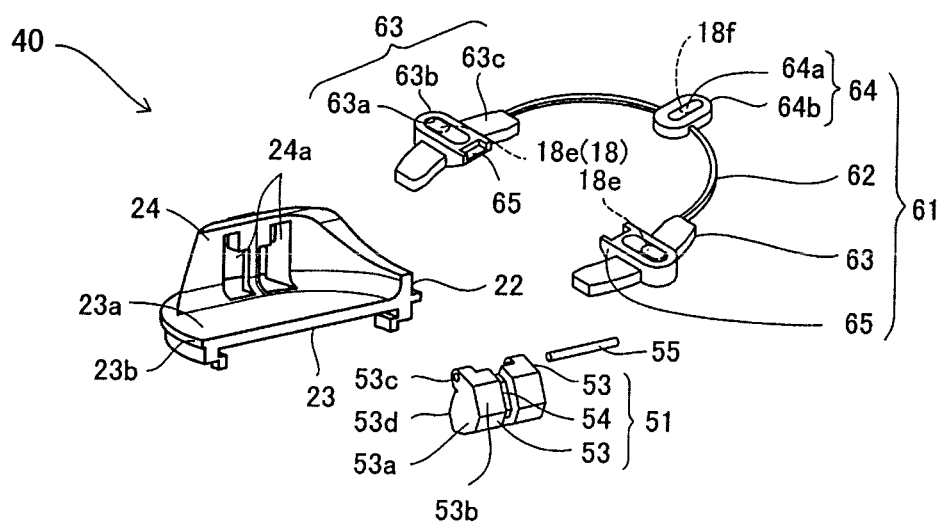
FIG. 10 is an exploded perspective view of the opening-closing activation mechanism.

FIG. 9 is a partial, fractured perspective view of the opening-closing activation mechanism 40, and FIG. 10 is a partial, fractured, exploded perspective view of the opening-closing activation mechanism 40. In FIG. 9 and FIG. 10, the nozzle detection mechanism 50 is a mechanism that releases the lock position of the opening-closing member 21 of the flap valve mechanism 20 via the lock mechanism 60 by being pressed by the tip of a fueling nozzle of a predetermined outer diameter, and is equipped with a nozzle detection member 51 mounted on the pressing member 22, and a pin 55. As shown in FIG. 10, the nozzle detection member 51 is equipped with introductory push parts 53 provided in parallel and a connecting part 54 that connects the introductory push parts 53, and this is formed as an integral unit using resin. Each introductory push part 53 is equipped with a pressing support unit 53a, a sloping push face 53b that is the outer surface of the pressing support unit 53a and that slopes facing the insertion path 13P side and downward, and a support part 53c. The sloping push face 53b is disposed so that it is pressed by the tip of the fueling nozzle when the outer diameter of the fueling nozzle tip is a predetermined diameter or greater. The introductory push part 53 is stored in the sensor insertion hole 24a of the pressing member 22, is supported to be able to oscillate by a pin 55 axially supported in the hole of the wall 24 by the support part 53c, and when the sloping push face 53b is pressed by the fueling nozzle FZ, it rotates in the radial direction outward with the pin 55 at the center.

The locking mechanism 60 is equipped with a lock member 61, and a locked part 70 (FIG. 9) formed on the pressing member 22 of the opening-closing member 21. In FIG. 10, the lock member 61 is equipped with a linking arm 62 that acts as a return spring, a locking support part 63 formed at both side of the linking arm 62, a locking support part 64 formed at the center of the linking arm 62, and a lock engaging part 65 formed as an integral unit with the locking support part 63. The locking support parts 63 at both sides are equipped with an arc portion 63b which forms a slot 63a, and a support plate 63c formed at both sides of the arc portion 63b. In the slot 63a, the support projections 18e provided projecting on the inlet forming member 18 are respectively inserted to be able to slide in the radial direction. Also, the locking support part 64 is equipped with the arc portion 64b having a slot 64a. In the slot 64a, the support projection 18f on the circular plate part 18a is inserted to be able to slide in the radial direction. As shown in FIG. 9, the lock engaging part 65, when pressed to the outside in the radial direction by the introductory push part 53 of the nozzle detection member 51, has its diameter expanded integrally with the locking support part 63 while the linking arm 62 is being elastically deformed. At this time, the locking support part 64 can also easily be moved in the radial direction of the lock engaging part 65 by moving to the inward radial direction.

The locked part 70 is provided projecting facing outward on the top part of the outer wall of the wall 24 of the opening-closing member 21 pressing member 22, and is a site that engages and disengages with the lock engaging part 65. Specifically, in a state for which the introductory push parts 53 are not pressing the lock member 61, the lock engaging part 65 is engaged with the locked part 70 and is in the locked position that restricts the opening operation of the opening-closing member 21, and meanwhile, by the introductory push parts 53 rotating with the pin 55 as the center, by the pressure end 53d pressing the pressing part 65a of the lock engaging part 65, the lock engaging part 65 is released from the locked part 70, goes to an unlocked position, and the opening operation of the opening-closing member 21 is allowed.

Figure 11A:
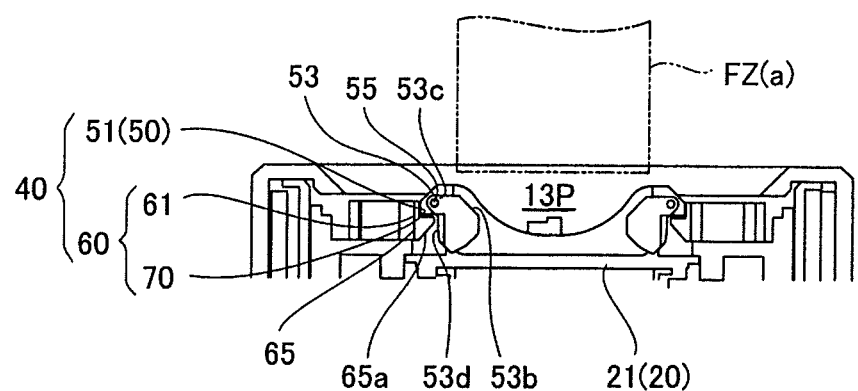
FIG. 11A shows the fueling operation of the fuel tank opening-closing device.
Figure 11B:
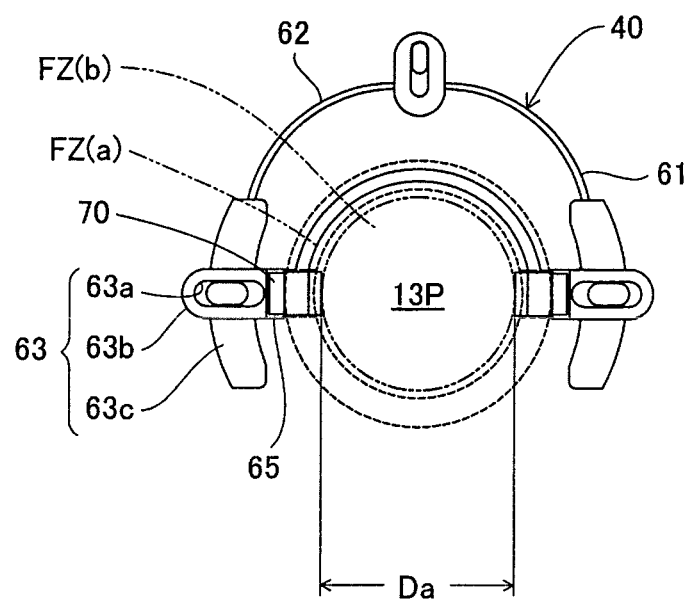
FIG. 11B shows the fueling operation of the fuel tank opening-closing device.
Figure 12A:
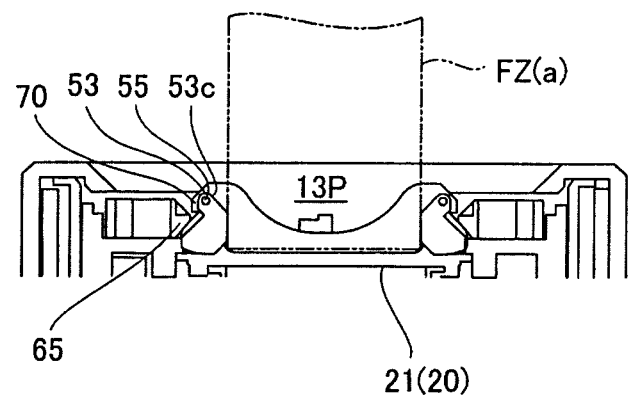
FIG. 12A shows the operation subsequent to FIG. 11A.
Figure 12B:
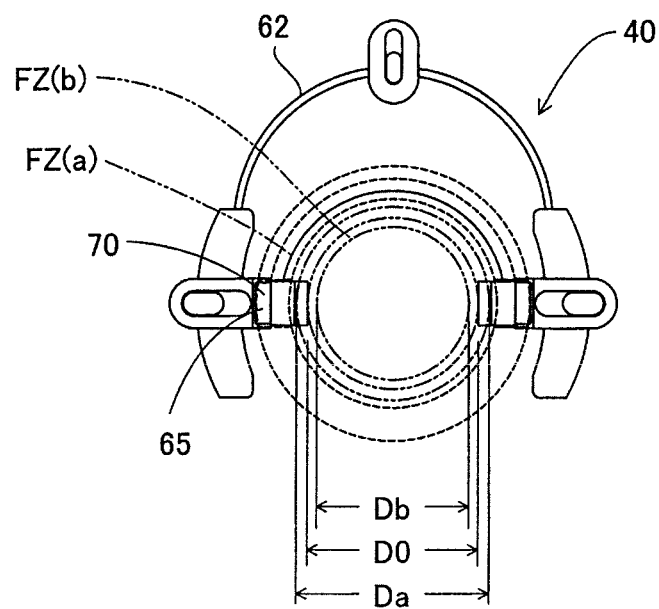
FIG. 12B shows the operation subsequent to FIG. 11B.

FIGS. 11A and 11B and FIGS. 12A and 12B are explanatory drawings for describing the nozzle detection mechanism 50, where FIGS. 11A and 11B show the state before insertion of the fueling nozzle, and FIGS. 12A and 12B shows the state with the fueling nozzle inserted. Specifically, if the inner diameter of the insertion path 13P formed by the inner ends facing opposite the introductory push parts 53 is D0, the outer diameter of the tip of the fueling nozzle FZ (a) for light oil is Da, and the outer diameter of the fueling nozzle FZ (b) for gasoline is Db, this is set to Db<D0<Da. For example, the outer diameter Db is set to 20 mm, the inner diameter D0 is set to 22 mm, and the outer diameter Da is set to 25 mm.

In the closed state of FIGS. 11A and 11B, when the fueling nozzle FZa is inserted in the insertion path 13P, and the sloping push face 53b of the introductory push part 53 of the nozzle detection member 51 is pressed, the nozzle detection member 51 rotates outward in the radial direction with the pin 55 as the center. By doing this, the pressure end 53d of the nozzle detection member 51 is pushed above the pressing part 65a of the lock engaging part 65 of the lock member 61. Then, as shown in FIGS. 12A and 12B, the lock engaging part 65 moves outward in the radial direction, is switched from the locked position to the unlocked position by being removed from the locked part 70, in other words, the lock of the opening-closing member 21 of the flap valve mechanism 20 is released, and the opening operation of the opening-closing member 21 is possible. Meanwhile, when the force rotating the introductory push part 53 is released, the lock engaging part 65 is returned inward in the radial direction by the spring force of the linking arm 62 (FIG. 10), and by engaging with the locked part 70, the opening-closing member 21 is locked, and the opening operation of the opening-closing member 21 is not possible.

Note that even when the inner diameter D0 of the insertion path 13P is a smaller diameter than the outer diameter Db of the gasoline fueling nozzle FZ (b), the lock is not released when the tip outer periphery part of the fueling nozzle FZ (b) presses the sloping push face 53b, and if it is a diameter for which fueling is not possible, a certain amount of dimensional range is permitted.

Figure 13:
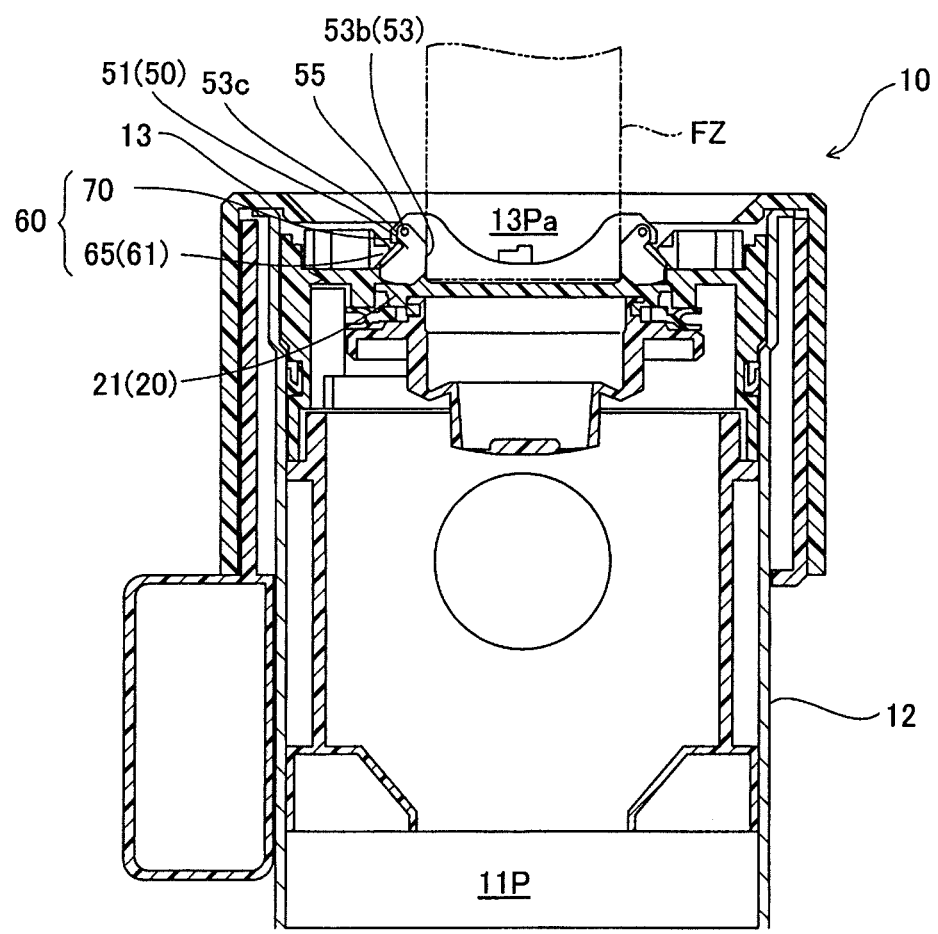
FIG. 13 shows the fueling operation of the fuel tank opening-closing device.

(3) Fuel Tank Opening-Closing Device Opening and Closing Operation (3)-1 Opening Operation As shown in FIG. 1, when the fueling lid FL is opened, the fuel tank opening-closing device 10 disposed inside the fueling bay FR appears. As shown in FIG. 13, the fueling nozzle FZ is inserted from the introduction port 13Pa of the opening forming member 13, the tip of the fueling nozzle FZ reaches the introductory push part 53 of the nozzle detection mechanism 50, presses the introductory push part 53, and when the sloping push face 53b receives the radial direction force from the fueling nozzle FZ, the nozzle detection member 51 of the nozzle detection mechanism 50 rotates with the pin 55 as the center, and the nozzle detection member 51 presses the lock engaging part 65 of the lock member 61 and moves it in the outer diameter direction. By doing this, the lock engaging part 65 is removed from the locked part 70, and is switched to the unlocked position. By doing this, the opening operation becomes possible for the opening-closing member 21.

Figure 14:
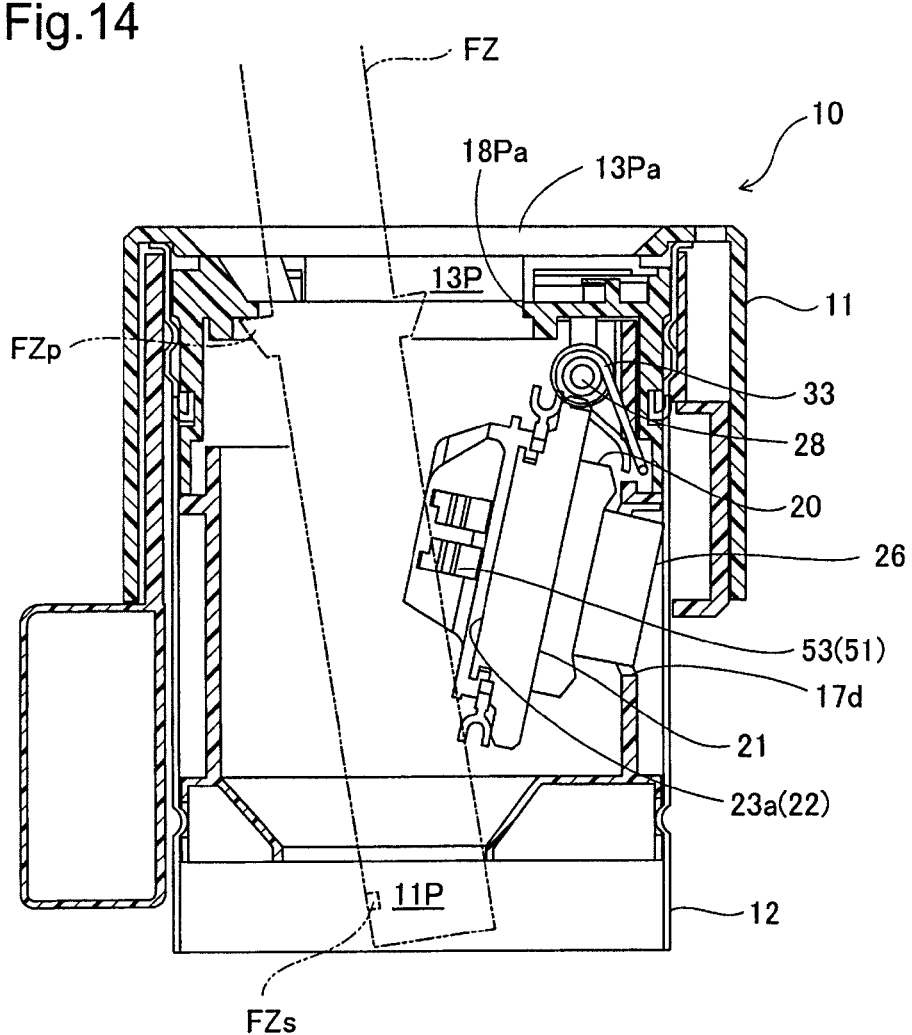
FIG. 14 shows the operation subsequent to FIG. 13.

Furthermore, as shown in FIG. 14, when the fueling nozzle FZ is pushed in, the opening-closing member 21 of the flap valve mechanism 20 presses in resistance to the energizing force of the spring 33, the opening-closing member 21 rotates with the shaft 28 as the center, and the inlet 18Pa is opened. At this time, with the opening-closing member 21, as its degree of openness increases, as the tip of the fueling nozzle FZ follows the guide face 23a of the pressing member 22, the opening-closing member 21 opens. Then, the bottom part of the valve chamber defining member 26 is inserted in the escape hole 17e, this contacts the inner wall of the connecting pipe 12, and the opening operation of the opening-closing member 21 is completed. In this state, fueling is done from the fueling nozzle FZ to the fuel passage 11P.

(3)-2 Closing Operation

When fueling ends, and the fueling nozzle FZ is removed from the inlet 18Pa, the opening-closing member 21 of the flap valve mechanism 20 closes the inlet 18Pa by the restoring force of the spring 33, and furthermore, when the fueling nozzle FZ is removed, the nozzle detection member 51 and the lock member 61 return to their initial positions, in other words, by the elastic force of the linking arm 62 of the locking mechanism 60, the lock engaging part 65 undergoes diameter reduction and the introductory push part 53 returns to its source position. In this way, when the lock engaging part 65 moves in the center direction of the opening-closing member 21, it engages with the locked part 70. By doing this, the opening-closing member 21 returns to its initial closed state at the locked position of the lock member 61, and furthermore, the fueling lid FL (FIG. 1) is closed.

(4) Fuel Tank Opening-Closing Device Operation and Effect

The following operational effects are exhibited by the fuel tank opening-closing device 10 of the embodiment noted above.

(4)-1 As shown in FIG. 6, with the opening-closing activation mechanism 40, only the nozzle detection member 51 constituting the nozzle detection mechanism 50 is mounted on the opening-closing member 21, and the lock member 61 constituting the locking mechanism 60 is mounted on the tank opening forming member 11, in other words, the lock member 61 does not have to be disposed on the opening-closing member 21, so it is not necessary to provide a complex moving mechanism for the opening-closing member 21, and it is possible to make the constitution simple.

(4)-2 The nozzle detection member 51 is mounted on the opening-closing member 21, so it is not necessary to install a plurality of members at locations facing the insertion path 13P of the tank opening forming member 11, and it is possible to make the constitution simple.

(4)-3 As shown in FIG. 14, when the fueling nozzle is inserted in the fuel passage 11P, fueling is done by the positioning part FZp latching with the opening peripheral edge part of the inlet 18Pa of the tank opening forming member 11. At this time, the introductory push part 53 works jointly with the opening-closing member 21 to move to the back of the fuel passage 11P, and retreats from the insertion path 13P that reaches from the introduction port 13Pa to the inlet 18Pa. Thus, the fueling nozzle FZ can be inserted from the inlet 18Pa to the fuel tank side without interference of the introductory push part 53, so the fuel rising in the fuel passage 11P contacts the full tank detection hole FZs at an early stage, and it is possible to operate auto stop. Thus, fuel does not easily leak from the insertion path 13P of the tank opening forming member 11.

(4)-4 As shown in FIGS. 11A and 11B and FIGS. 12A and 12B, when inserting the fueling nozzle FZ, the movement direction of the introductory push part 53 of the nozzle detection member 51 and the movement direction of the lock member 61 are the same in the outward radial direction, so a mechanism such as a cam for converting the operating direction is not necessary, and the constitution is simple.

(4)-5 As shown in FIG. 6 and FIG. 10, with the lock member 61 of the lock mechanism 60, the support projections 18e and 18f of the inlet forming member 18 are respectively inserted in the slots 63a and 64a of the locking support parts 63 and 64, the lock member 61 is suppressed by the upper wall 13b of the opening forming member 13, and is held in the inlet forming member 18, so a separate mechanism for retaining the lock member 61 is unnecessary, and it is possible to make the constitution simple.

(4)-6 As shown in FIGS. 11A and 11B and FIGS. 12A and 12B, to do the opening operation of the opening-closing member 21 of the flap valve mechanism 20, in a state with the fueling lid FL (FIG. 1) open, the introductory push part 53 has to be moved in the outward radial direction by the fueling nozzle FZ, so even with a high pressure car washer or the wrong fueling nozzle inserted, the introductory push part 53 does not move, and the opening-closing member 21 does not inadvertently do the opening operation.

(4)-7 As shown in FIGS. 11A and 11B and FIGS. 12A and 12B, the nozzle detection mechanism 50 is equipped with the introductory push part 53 disposed so as to be pressed when the outer diameter of the tip of the fueling nozzle FZ is of a predetermined diameter or greater, so in the case of the fueling nozzle FZ (a) for light oil, the opening-closing member 21 of the flap valve mechanism 20 performs the opening operation, but in the case of the fueling nozzle FZ (b) for gasoline, the opening-closing member 21 does not perform the opening operation. Therefore, when the fuel type differs according to the outer diameter of the fueling nozzle FZ, even when the wrong fueling nozzle FZ is inserted, the inlet 18Pa does not open, so there is no supplying of the wrong type of fuel.

B. Second Embodiment

Figure 15:
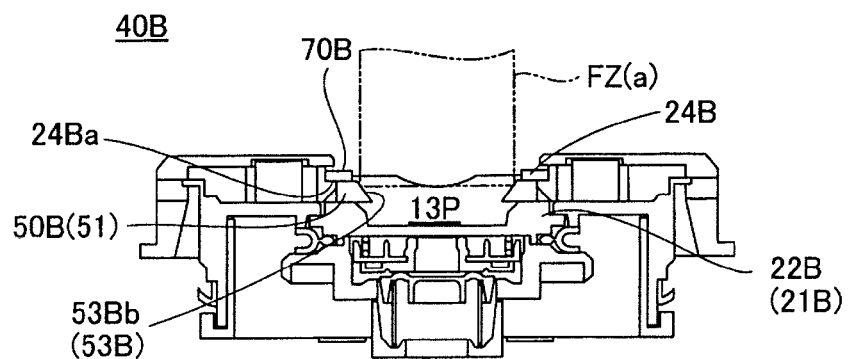
FIG. 15 is a cross sectional view showing the fuel tank opening-closing device of the second embodiment of the present invention.
Figure 16:
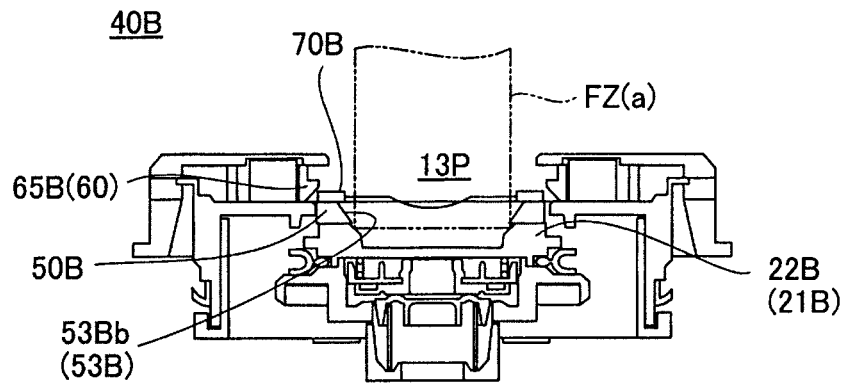
FIG. 16 shows the fueling operation subsequent to FIG. 15.
Figure 17:
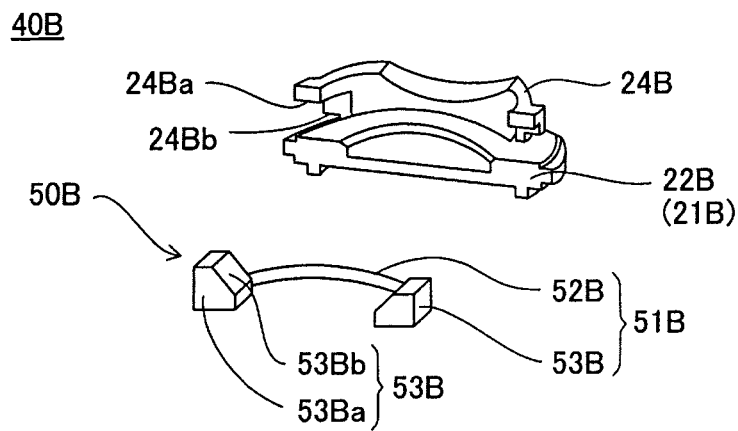
FIG. 17 is a partial, fractured and exploded perspective view of the nozzle detection member and the pressing member.

FIG. 15 and FIG. 16 are cross sectional views showing the fuel tank opening-closing member of the second embodiment of the present invention, and FIG. 17 is a partial, fractured, exploded perspective view of the nozzle detection member 51B and the pressing member 22B. The second embodiment has its characteristic feature in the constitution of the nozzle detection mechanism 50B of the opening-closing activation mechanism 40B. In FIG. 17, the nozzle detection mechanism 50B is equipped with a nozzle detection member 51B mounted on the pressing member 22B. The nozzle detection member 51B is equipped with an arm 52B, and introductory push parts 53B disposed facing the insertion path 13P formed at both end parts of the arm 52B, and these are formed as an integral unit using resin. Each of the introductory push parts 53B has a trapezoidal cross section, and is equipped with a pressing support unit 53Ba, and a sloping push face 53Bb sloping facing downward facing the insertion path 13P from the pressing support unit 53Ba. The sloping push face 53Bb is disposed so as to be pressed by the tip of the fueling nozzle when the tip of the fueling nozzle FZ is of a predetermined diameter or greater. The arm 52B is elastically deformed in the outer diameter direction when the sloping push face 53Bb is pressed by the fueling nozzle FZ, and acts as a return spring. As the constitution for mounting the nozzle detection member 51B on the pressing member 22, an attachment recess 24Ba is formed on the wall 24B of the pressing member 22B. Also, a ring shaped receiving recess 24Bb is formed on the outer periphery part of the attachment recess 24Ba, and the nozzle detection member 51B is mounted on the opening-closing member 21B by the arm 52B of the nozzle detection member 51 being held.

With the constitution of the opening-closing activation member 40B, as shown in FIG. 15, the fueling nozzle FZ is inserted in the insertion path 13P, and when the tip of the fueling nozzle FZ reaches the introductory push part 53B of the nozzle detection mechanism 50B, and the introductory push part 53B is pressed, as shown in FIG. 16, while the arm 52B (FIG. 17) of the nozzle detection mechanism 50B nozzle detection member 51B bends so as to accumulate spring force, there is diameter expansion of the nozzle detection member 51B. By doing this, the outer periphery part of the introductory push part 53B presses the lock engaging part 65B of the locking mechanism 60B, moving it in the outward radial direction, and the lock member 61B is removed from the locked part 70, thus switching to the unlocked position. By doing this, the opening-closing member 21B is able to do the opening operation.

Figure 18:
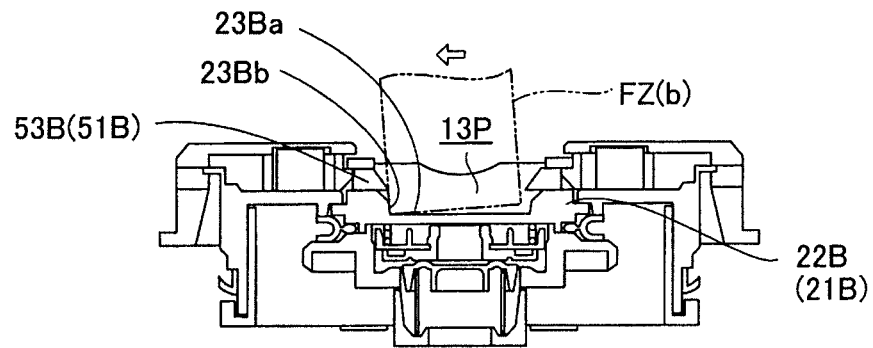
FIG. 18 shows the operation of the second embodiment.

Also, as shown in FIG. 18, the guide surface 23Ba of the pressing member 22B of the opening-closing member 21B is a recess with a reduced diameter, and the side surface of the recess becomes a restriction wall 23Bb. As shown in FIG. 15, when the fueling nozzle FZa for light oil is inserted in the insertion path 13P, before contacting the guide surface 23Ba, it contacts the introductory push parts 53B of the nozzle detection member 51B, and the lock is released. However, as shown in FIG. 18, when the small diameter fueling nozzle FZ (b) for gasoline is inserted, even when just one introductory push part 53B is contacted, the lock is not released, and in fact since this is restricted by the restriction wall 23Bb, even if the fueling nozzle FZ (b) is shaken laterally, there is no inadvertent releasing of the lock.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

The invention claimed is:
1. A fuel tank opening-closing device for opening and closing a path for supplying fuel to a fuel tank, the fuel tank opening-closing, device comprising:
a tank opening forming member that includes (i) a fuel path connected to the fuel tank, (ii) an insertion path for inserting a fueling nozzle, and (iii) an inlet disposed between the fuel path and the insertion path;

a flap valve mechanism that is disposed inside the tank opening forming member, and has an opening-closing member for opening and closing the inlet by being pressed by an outside end of the fueling nozzle; and an opening-closing activation mechanism that can switch between a locked position in which opening operation of the opening-closing member is locked, and an unlocked position in which opening operation of the opening-closing member is permitted when the opening-closing member is pushed by the fueling nozzle;

wherein the opening-closing activation mechanism includes:

a nozzle detection mechanism having introductory push parts mounted on the opening-closing member and disposed in the insertion path, and adapted to receive force of motion in an insertion direction of the fueling nozzle though being pressed by the outside end of the fueling nozzle; and a locking mechanism having (i) a lock member that is mounted on the tank opening forming member near the inlet, wherein the lock member has a lock engaging part to be movably supported to the tank opening forming member in a radial direction of the insertion path, and (ii) a locked part that is disposed on the opening-closing, member and selectively shifts to the locked position and the unlocked position by engaging and disengaging with the opening-closing member, wherein the locking mechanism is configured such that the introductory push part presses the lock member outward in the radial direction and then the lock member shifts from the locked position to the unlocked position to disengaging with the locked part when the introductory push parts are pushed by the outside end of the fueling nozzles, and wherein the opening-closing member includes an upper face part that receives pressing force of the fueling nozzle, wherein a part of the introductory push part initially receiving the pressing force by the outside end of the fueling nozzle is disposed above the upper face part.

2. The fuel tank opening-closing device according to claim 1, wherein the opening-closing member includes walls projecting upward from both sides of an outer periphery part of the upper face part, wherein the walls includes a sensor insertion hole for storing the introductory push part above the upper face part.

3. The fuel tank opening-closing device according to claim 1, wherein the lock member includes a linking arm that connects a plurality of the lock engaging parts.

4. The fuel tank opening-closing device according to claim 1, wherein the opening-closing member includes a valve chamber defining member that forms a valve chamber with the upper face part, and a pressure regulating valve that is stored inside the valve chamber for regulating tank internal pressure of the fuel tank.

5. The fuel tank opening-closing device according to claim 1, wherein the upper face part includes a guide face for smoothing the contact with the end of the fueling nozzle.

6. A fuel tank opening-closing device for opening and closing a path for supplying fuel to a fuel tank, the fuel tank opening-closing device comprising:

a tank opening forming member that includes (i) a fuel path connected to the fuel tank, (ii) an insertion path for inserting a fueling nozzle, and (iii) an inlet disposed between the fuel path and the insertion path;

a flap valve mechanism that is disposed inside the tank opening forming member, and has an opening-closing member for opening and closing the inlet by being pressed by an outside end of the fueling nozzle; and an opening-closing activation mechanism that can switch between a locked position in which opening operation of the opening-closing member is locked, and an unlocked position in which opening operation of the opening-closing member is permitted when the opening-closing member is pushed by the fueling nozzle;

wherein the opening-closing activation mechanism includes:

a nozzle detection mechanism having introductory push parts mounted on the opening-closing member and disposed in the insertion path, and adapted to receive force of motion in an insertion direction of the fueling nozzle though being pressed by the outside end of the fueling nozzle; and a locking mechanism having (i) a lock member that is mounted on the tank opening forming member near the inlet, wherein the lock member has a lock engaging part to be movably supported to the tank opening forming member, and (ii) a locked part that is formed on the opening-closing member and selectively shifts to the locked position and the unlocked position by engaging and disengaging with the opening-closing member, wherein the locking mechanism is configured such that the introductory push parts press the lock member and then the lock member shifts from the locked position to the unlocked position when the introductory push parts are pushed by the outside end of the fueling nozzle, and wherein the opening-closing member includes an upper face part that receives pressing force of the fueling nozzle, wherein a part of the introductory push part initially receiving the pressing force by the outside end of the fueling nozzle is disposed above the upper face part.

7. The fuel tank opening-closing device according to claim 2, wherein the introductory push parts are pivotally supported by a pin axially supported in the wall.

8. The fuel tank opening-closing device according to claim 7, wherein the introductory push parts include a sloping push face sloping and facing the insertion path, a pressure end disposed at an outside end in the radial direction relative to the sloping push face, and the locked part disposed at an outside end in the radial direction relative to the sloping push face and disposed above the pressure end, and the locking mechanism is configure such that by the introductory push parts rotating around the center of the pin, the pressure end presses the lock member, the locked part disengages with the lock engaging part, thereby the locking mechanism shifting from locked position to the unlocked position.

9. The fuel tank opening-closing device according to claim 2, wherein the introductory push parts are disposed in parallel at an outer periphery part of the opening-closing member and disposed along an outer part of the insertion path.

10. The fuel tank opening-closing device according to claim 9, wherein the nozzle detection mechanism includes an arm connecting both of the introductory push parts, wherein the arm is configured to accumulate spring force when the introductory push parts are pressed by the fueling nozzle.

11. The fuel tank opening-closing device according to claim 6, wherein the introductory push parts are disposed in parallel at an outer periphery part of the opening-closing member and disposed along an outer part of the insertion path.

12. The fuel tank opening-closing device according to claim 11, wherein the nozzle detection mechanism includes an arm connecting both of the introductory push parts, wherein the arm is configured to accumulate spring force when the introductory push parts are pressed by the fueling nozzle.

13. The fuel tank opening-closing device according to claim 6, wherein the lock member includes a linking arm that connects a plurality of the lock engaging parts.

14. The fuel tank opening-closing device according to claim 6, wherein the opening-closing member includes a valve chamber defining member that forms a valve chamber with the upper face part, and a pressure regulating valve that is stored inside the valve chamber for regulating tank internal pressure of the fuel tank.

15. The fuel tank opening-closing device according to claim 6, wherein the upper face part includes a guide face for smoothing the contact with the end of the fueling nozzle.

16. The fuel tank opening-closing device according to claim 6, wherein the opening-closing member includes walls projecting upward from both sides of an outer periphery part of the upper face part, wherein the walls include a sensor insertion hole for storing the introductory push part above the upper face part.

* * * * *